United States Patent Office
2,967,752
Patented Jan. 10, 1961

2,967,752
BLUE DISPERSE DYESTUFFS OF THE ANTHRAQUINONE SERIES
Paul Bücheler, Reinach, Switzerland, assignor to Sandoz Ltd., Basel, Switzerland
No Drawing. Filed May 18, 1959, Ser. No. 813,616
Claims priority, application Switzerland May 30, 1958
7 Claims. (Cl. 8—25)

This invention relates to blue disperse dyestuffs of the anthraquinone series which have the formula:

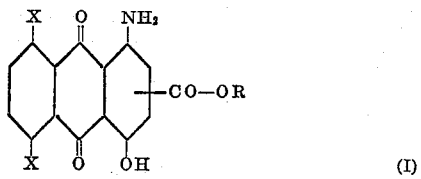

(I)

wherein one X stands for the hydroxy group, the other X for the amino group and R for an alkyl group which may be further substituted.

The process according to the invention consists in converting in a compound of the formula:

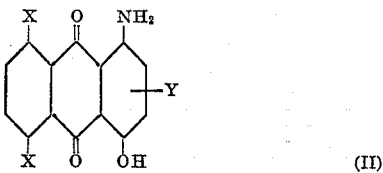

(II)

wherein the two X's possess the aforecited meanings and Y represents the nitrile or the carboxylic acid group, the substituent Y into a carboxylic acid alkyl ester radical which may be further substituted.

The carboxylic acids can be esterified by known methods, e.g. by treatment with diazomethane or with alcohol in concentrated sulfuric or phosphoric acid at 90–110° C. Alcohols suitable for this purpose are e.g. the monovalent primary and secondary alcohols of methanol up to about amyl alcohol, halogenoalcohols (chloroethanol, chloropropanol), alkoxyalcohols and alkoxyalkoxyalcohols (ethoxyethanol, methoxypropanol, methoxybutanol, methoxyethoxyethanol, ethoxy-ethoxyethanol), and multivalent alcohols (ethylene glycol, propylene glycol, 1,3-propanediol).

To convert the nitriles into the carboxylic acid esters they are treated with e.g. a mixture of an alcohol and concentrated sulfuric acid at temperatures of 80° to 110° C.

The nitriles which are used as starting materials may be obtained e.g. by reacting the corresponding halogen compounds with cuprous cyanide and pyridine in nitrobenzene within the temperature range of 190° to 210° C.

The carboxylic acids are obtained by saponifying the nitriles in e.g. strong mineral acids, preferably sulfuric acid, at temperatures between 80° and 140° C.

A second method for the production of the diaminodihydroxyanthraquinone carboxylic acids consists in reducing an anthraquinone compound of the formula:

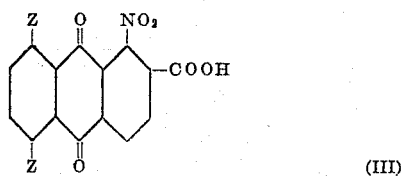

(III)

wherein one Z represents hydrogen and the other Z the nitro group, halogenating the 1.5(8)-diaminoanthraquinone-2-carboxylic acid in the 4.8(5)-positions, and replacing the halogen atoms by hydroxy groups. Halogenation can be carried out in inert organic solvents such as dichlorobenzene, nitrobenzene or trichlorobenzene, preferably at temperatures of 80° to 200° C., if desired with the assistance of a halogen carrier such as iodine, aluminum chloride etc., or in sulfuric acid at temperatures ranging from 20° to 140° C.

The halogen atoms are exchanged for hydroxy groups by treatment in concentrated sulfuric acid with the assistance of boric acid and preferably at temperatures between 80° to 160° C.

A third method consists in reducing a 1.5(8)-dinitroanthraquinone-2-carboxylic acid to 1.5(8)-di(hydroxylamino)-anthraquinone-2-carboxylic acid in one operation by treatment with sulfur sesquioxide in concentrated sulfuric acid, preferably in presence of boric acid, with subsequent rearrangement to give 1.5(8)-diamino-4.8(5)-dihydroxyanthraquinone-2-carboxylic acid.

The esters thus obtained are valuable dyestuffs of the anthraquinone series. They are generally soluble in the commonly used organic solvents. Upon conversion into a finely divided state, e.g. by grinding in aqueous suspension in presence of a suitable dispersing agent, they are eminently suitable for the dyeing and printing of cellulose ester and cellulose ether fibers and linear aromatic polyester fibers.

The dyeings on acetate possess very good fastness properties to light, washing, perspiration and gas fumes.

Triacetate is dyed in blue shades which are very fast to light, washing, perspiration, heat setting and pleating.

The dyeings on linear aromatic polyesters have excellent fastness properties to light, washing, perspiration, pleating and heat setting.

In the following examples the parts and percentages are by weight and the temperatures in degrees centigrade.

EXAMPLE 1

7 parts of 1.5-diamino-2-cyano-4.8-dihydroxyanthraquinone, 40 parts of n-propylalcohol and 28 parts of 96% sulfuric acid are stirred for 24 hours at 100°. Thereupon the reaction mass is poured into 500 parts of water and the precipitate formed filtered with suction. The residue is washed with water until of neutral reaction and dried at 40° with vacuum.

1 part of the 1.5-diamino-4.8-dihydroxyanthraquinone-2-carboxylic acid-n-propyl ester thus produced is ground with 1 part of the sodium salt of dinaphthylmethanedisulfonic acid and 8 parts of water until a fine dispersion is obtained. The dispersion is run into a solution of 2 parts of 2-hydroxy-1.1'-diphenyl and 2 parts of highly sulfonated castor oil in 3000 parts of water. A piece (100 parts) of polyester fiber fabric is introduced into this dyebath at 60°. The dyebath is brought to the boil in the course of 20 minutes and dyeing continued at the same temperature for 1 hour. The fabric is removed, rinsed with water, and aftertreated for 15 minutes at 70° in a bath consisting of 1.5 parts of an alkylphenylpolyglycol ether in 3000 parts of water, after which it is again rinsed and dried. The polyester fiber fabric is dyed in a greenish blue shade which has excellent fastness to light, washing and pleating.

The 1.5-diamino-2-cyano-4.8-dihydroxyanthraquinone used as starting material can be produced as follows.

18 parts of 1.5-diamino-2-bromo-4.8-dihydroxyanthraquinone, 5 parts of cuprous cyanide, 100 parts of nitrobenzene and 5 parts of pyridine are mixed for 20 hours at 200°. The reaction mass is allowed to cool, and the precipitate formed is then filtered with suction and washed with ethyl alcohol until the nitrobenzene is eliminated. The reaction product is stirred for 6 hours at 70° in 500 parts of 5% hydrochloric acid. Thereupon the precipitate is filtered off, washed with hot water and dried.

EXAMPLE 2

5 parts of 1.5-diamino-4.8-dihydroxyanthraquinone-2-carboxylic acid, 40 parts of benzene and 50 parts of a 2% ethereal diazomethane solution are mixed at 25° over a period of 15 hours, following which the reaction solution is run into 250 parts of petroleum ether. The resulting precipitate is filtered off, washed with petroleum ether until the filtrate runs clear, and dried.

1 part of the 1.5-diamino-4.8-dihydroxyanthraquinone-2-carboxylic acid methyl ester thus obtained, 1 part of sodium ligninsulfonate and 8 parts of water are ground until a fine dispersion is obtained, which is then run into a solution of 6 parts of Marseilles soap in 3000 parts of water. In the dyebath thus prepared a piece (100 parts) of a fabric of secondary cellulose acetate is entered. The temperature of the dyebath is increased to 80° in 30 minutes and this temperature maintained for 1 hour. The fabric is then removed, rinsed with water and dried. It is dyed to a blue shade that has good fastness to light, washing and gas fumes. Fabrics of polyester fiber may also be dyed in a dyebath of the above composition; the blue dyeings produced show very good washing and pleating fastness and are outstandingly fast to light.

The 1.5-diamino-4.8-dihydroxyanthraquinone-2-carboxylic acid used as starting material can be obtained from its nitrile described in Example 1 by saponification in 80% sulfuric acid.

EXAMPLE 3

12 parts of 1.5-dinitroanthraquinone-2-carboxylic acid, 185 parts of 100% sulfuric acid, 10 parts of boric acid and 6 parts of powdered sulfur are mixed at 50°. To the mixture at 50–55° are added dropwise 30 parts of oleum containing 66% of sulfur trioxide. The reaction mass is stirred for 24 hours at 120° and then run into 1500 parts of water. The precipitate is filtered with suction, washed with water, and dried.

7 parts of the 1.5-diamino-4.8-dihydroxyanthraquinone-2-carboxylic acid thus obtained, 50 parts of 83% phosphoric acid and 15 parts of ethyl alcohol are mixed together for 15 hours at 100°. The reaction mass is then stirred into 500 parts of water and the precipitate so formed is filtered with suction and washed with water. During 30 minutes it is stirred into 500 parts of a 1% ammonium hydroxide solution, and subsequently filtered with suction, washed with water until of neutral reaction, and dried.

1 part of the resulting 1.5-diamino-4.8-dihydroxyanthraquinone-2-carboxylic acid ethyl ester is ground with 1 part of the sodium salt of dinaphthylmethanedisulfonic acid and 8 parts of water until a fine dispersion is obtained. This is poured into a blind dyebath set with 3000 parts of water and 6 parts of a sulfonated fatty alcohol. 100 parts of a fabric of cellulose triacetate are introduced into the bath, which is then heated to 100° in 1 hour and maintained at this temperature for a further hour. The dyed fabric is removed, rinsed and dried. The blue dyeing produced has good fastness to light, washing, gas fumes and pleating.

Dyeings of excellent fastness to light, washing and pleating are obtained on fibers and fabrics of linear aromatic polyesters from dyebaths of the above composition at a dyeing temperature of 98° and in presence of a suitable carrier.

In place of the 1.5-dinitroanthraquinone-2-carboxylic acid of the above example, one can start with an equal amount of 1.8-dinitroanthraquinone-2-carboxylic acid or with a mixture in any desired proportions of 1.5- and 1.8-dinitroanthraquinone-2-carboxylic acid and arrive at dyestuffs with similar dyeing properties.

EXAMPLE 4

10 parts of 1.8-diamino-4.5-dihydroxyanthraquinone-2-carboxylic acid, 185 parts of 100% sulfuric acid and 30 parts of ethyl alcohol are mixed for 15 hours at 100°. The reaction mass is then poured in 100° parts of water, and the resulting precipitate filtered off and washed with water. Subsequently it is stirred with 1000 parts of a 1% ammonium hydroxide solution for 30 minutes at room temperature, then filtered off, washed with water until of neutral reaction, and dried. The 1.8-diamino-4.5-dihydroxyanthraquinone-2-carboxylic acid ethyl ester so formed possesses dyeing properties similar to those of the dyestuff described in Example 3.

The 1.8-diamino-4.5-dihydroxyanthraquinone-2-carboxylic acid used in the above example can be produced from 1.8-diamino-2-bromo-4.5-dihydroxyanthaquinone by reaction with cuprous cyanide followed by saponification of the resulting nitrile, as described in Examples 1 and 2 for 1.5-diamino-4.8-dihydroxyanthraquinone-2-carboxylic acid.

The esters listed in the following table can be produced by procedures similar to those described in the above examples.

Table

| Example No. | Acid | Esterified with— | Color of solution in chlorobenzene |
|---|---|---|---|
| 5 | 1.5-diamino-4.8-dihydroxyanthraquinone-2-carboxylic acid. | iso-propyl alcohol | blue. |
| 6 | ...do... | n-butyl alcohol | Do. |
| 7 | ...do... | iso-butyl alcohol | Do. |
| 8 | ...do... | 2-hydroxyethylalcohol | Do. |
| 9 | ...do... | 2-methoxyethyl-alcohol. | Do. |
| 10 | ...do... | 2-ethoxyethylalcohol | Do. |
| 11 | ...do... | 2(2'-methoxy)-ethoxyethyl alcohol. | Do. |
| 12 | ...do... | 4-methoxybutyl-alcohol. | Do. |
| 13 | ...do... | 2-chloroethylalcohol | Do. |
| 14 | ...do... | 3-chloropropylalcohol. | Do. |
| 15 | 1.8-diamino-4.5-dihydroxyanthraquinone-2-carboxylic acid. | methyl alcohol | Do. |
| 16 | ...do... | n-propyl alcohol | Do. |
| 17 | ...do... | iso-propyl alcohol | Do. |
| 18 | ...do... | n-butyl alcohol | Do. |
| 19 | ...do... | 2-ethoxyethyl alcohol | Do. |
| 20 | ...do... | 3-hydroxypropyl alcohol. | Do. |
| 21 | ...do... | 3-methoxypropyl alcohol. | Do. |
| 22 | ...do... | 2-chloroethyl alcohol | Do. |
| 23 | Mixture of 1.8-diamino-4.5-dihydroxyanthraquinone-2-carboxylic acid and 1.5-diamino-4.8-dihydroxy-anthraquinone-2-carboxylic acid. | methyl alcohol | Do. |
| 24 | ...do... | n-propyl alcohol | Do. |
| 25 | ...do... | 2-hydroxyethyl alcohol. | Do. |
| 26 | ...do... | 2-hydroxypropyl alcohol | Do. |
| 27 | ...do... | 2-ethoxyethyl alcohol | Do. |
| 28 | ...do... | 2-[(2'-methoxy)-ethoxy]-ethyl alcohol. | Do. |
| 29 | ...do... | 2-chloropropyl alcohol | Do. |
| 30 | ...do... | 2-[(2'-ethoxy)-ethoxy]-ethyl alcohol. | Do. |

Formulae of representative dyestuffs of the foregoing examples are:

EXAMPLE 1

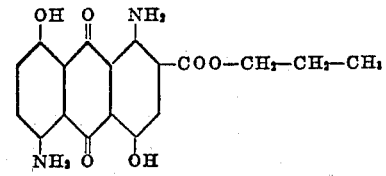

EXAMPLE 2

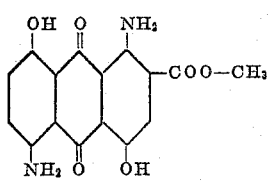

EXAMPLE 3 (SECOND PARAGRAPH)

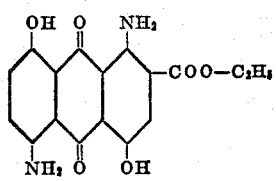

EXAMPLE 3 (LAST PARAGRAPH)

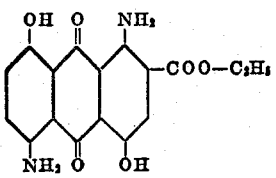

and

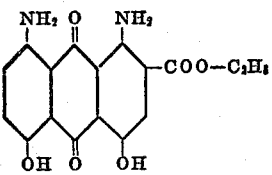

EXAMPLE 4

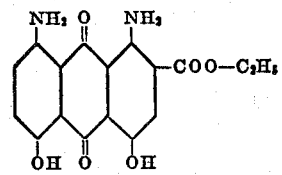

EXAMPLE 5

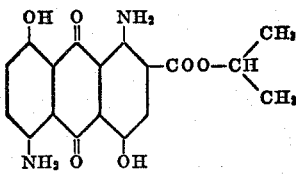

Having thus disclosed the invention what I claim is:
1. A disperse dyestuff of the anthraquinone series of the formula:

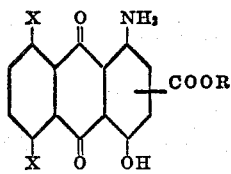

wherein one X stands for the hydroxy group, the other X stands for the amino group and R stands for a member selected from the group consisting of lower alkyl, lower hydroxyalkyl, lower alkoxyalkyl, lower alkoxyalkoxyalkyl and lower chloroalkyl.

2. A disperse dyestuff of the anthraquinone series of the formula:

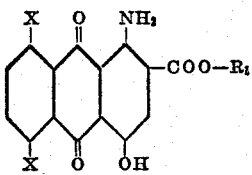

wherein one X stands for the hydroxy group, and the other X stands for the amino group and $R_1$ represents a lower alkyl group.

3. The disperse dyestuff of the anthraquinone series of the formula:

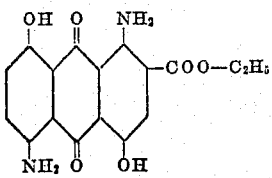

4. The disperse dyestuff of the anthraquinone series of the formula:

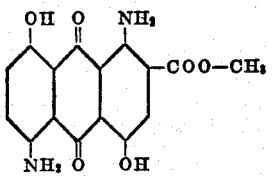

5. The disperse dyestuff of the anthraquinone series of the formula:

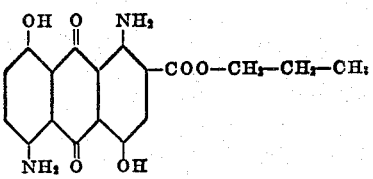

6. The disperse dyestuff of the anthraquinone series of the formula:

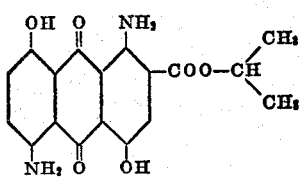

7. The mixture of disperse dyestuffs of the anthraquinone series of the formulae:

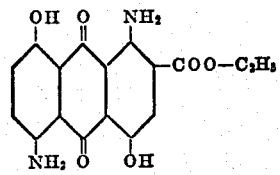

and

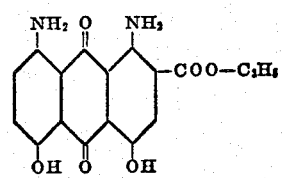

References Cited in the file of this patent

UNITED STATES PATENTS

| | | |
|---|---|---|
| 2,060,186 | Felix et al. | Nov. 10, 1936 |
| 2,342,191 | Grossmann | Feb. 22, 1944 |
| 2,485,197 | Grossmann | Oct. 18, 1949 |
| 2,506,020 | Grossmann | May 2, 1950 |
| 2,823,212 | Anton et al. | Feb. 11, 1958 |
| 2,894,800 | Guenther et al. | July 14, 1959 |

FOREIGN PATENTS

| | | |
|---|---|---|
| 815,697 | France | July 20, 1937 |
| 727,387 | Germany | Nov. 2, 1942 |
| 260,551 | Switzerland | Aug. 1, 1949 |